Patented May 21, 1940

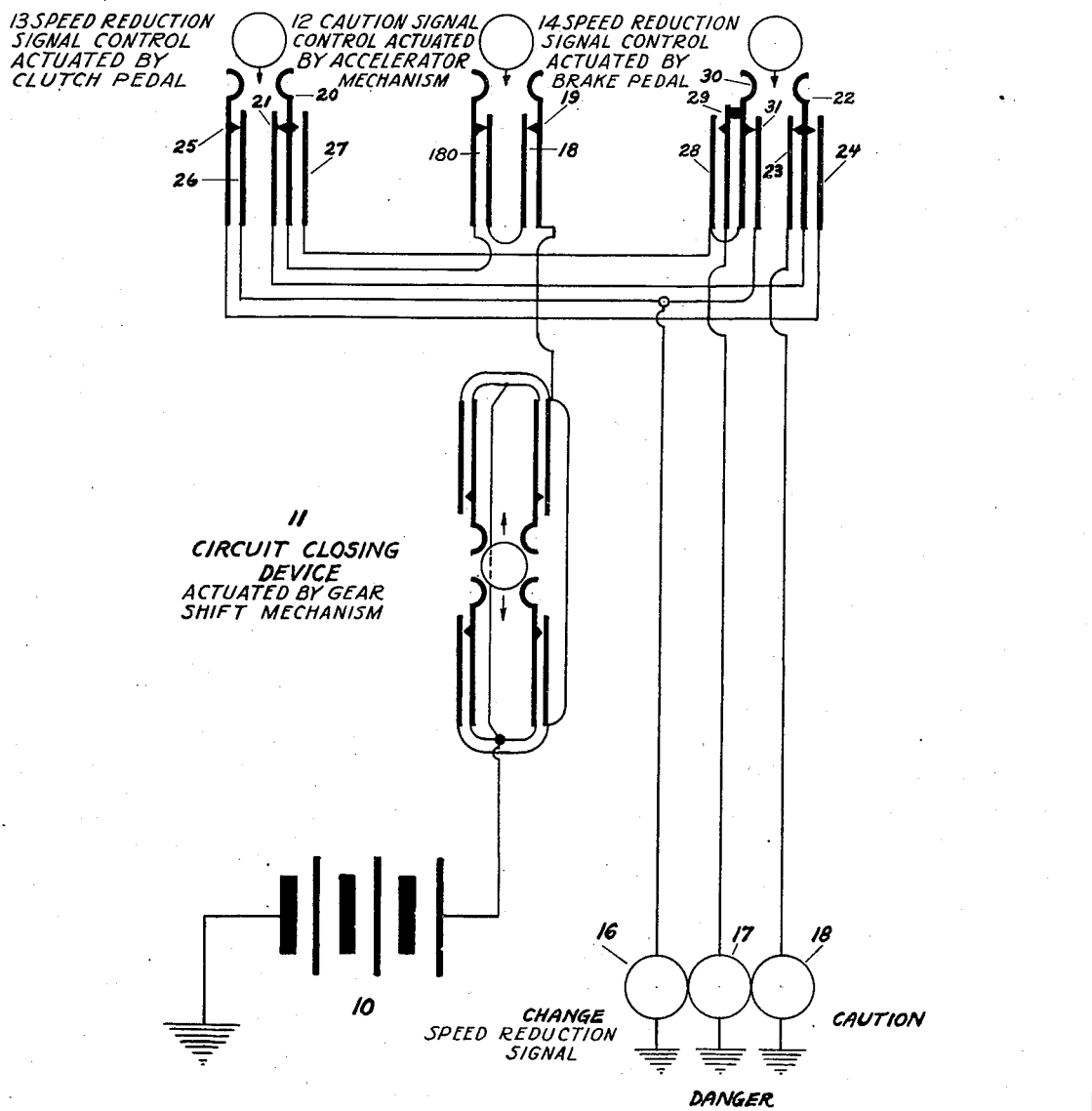

2,201,687

UNITED STATES PATENT OFFICE 2,201,687

VEHICLE SIGNAL SYSTEM

Benjamin Lot Parker, Genoa, Ill.

Application May 9, 1936, Serial No. 78,804

4 Claims. (Cl. 177—339)

The object of my invention is to provide means by which a decrease in traveling speed of a leading motor vehicle is made known to drivers of vehicles following, and, these signals shall be independent of thought or action of the driver of the leading motor vehicle.

More specifically, it is the object of my invention to provide a system of signals, actuated by the operating controls of a motor vehicle, said signals to indicate to other units of motor traffic a change to lower speed, an increase in rate of change to lower speed, and danger induced by a pronounced retardation of speed.

A further object is to provide signals and warnings to other vehicular traffic and render unnecessary hand signalling as at present practiced to some extent.

It is a further object to display distinctive signals at successive decreases from normal driving speed. A slight decrease in speed is indicated by a caution signal, a more pronounced decrease in speed is indicated by a speed reduction signal, a greatly retarded speed is indicated by a danger or stop signal. These and other objects will be apparent to those skilled in the art. It will be noted that as my system acts to protect the following motor vehicles only, an auxiliary hand signal designating turns will be of great convenience but not a necessity for safety.

My invention consists in the construction, arrangement, combination, and timing of the various devices whereby the objects contemplated are attained as hereinafter more fully set forth, pointed out in my claims, and illustrated in the accompanying diagram in which—

The figure is a wiring diagram showing the application of my system to an automotive vehicle of the conventional type with foot accelerator, gear shift mechanism, foot brake, and clutch pedal.

The numeral 10 indicates the storage battery of the motor vehicle electrically connected to frame (ground) and to 11 circuit closing device for all signals and in turn actuated by the gear shift mechanism when gears are shifted from neutral position. 12 is a caution signal control device in electrical connection with 11, and actuated by the accelerator mechanism. Continuing the electrical circuit, 13 is a speed reduction signal control device actuated by the clutch pedal, interconnected electrically to a second speed change control device 14 controlled by the brake pedal. It will be evident to the skilled mechanician there are two ways to actuate reduction signal control devices 13 and 14. First, a mechanical control and second, an electrical contact in turn actuating a relay of the conventional type performing the functions of make and break of the electrical circuit which will now be described in more detail.

Caution signal is designated 18, speed reduction signal 16, and danger or stop signal 17, all in electrical connection with their respective control devices which in turn are so arranged and interconnected electrically that one signal only is energized at one time.

The practical application of my invention will now be traced as the several signals are energized by the successive operations that may be used by a driver to reduce the speed of an automotive vehicle traveling at normal high speed. At the moment, the gears are shifted into running position, the accelerator pedal is depressed, the clutch is engaged and brake released. In this status the battery feed circuit is closed by switch 11 operated by gear shift mechanism and in turn caution signal 18 is de-energized by device 12 actuated to open the circuit when accelerator pedal is depressed. The first action of the driver to reduce speed is to remove his foot from the accelerator pedal thus energizing instantly caution signal 18 by closing switch contacts 180 and 19 in switch 12 and thru switch members 20 and 21 in switch 13, and 22 and 23 in switch 14. The next move on the part of the driver will be to push down either the clutch or brake pedal, depending on how quickly he desires to stop. In either case his action de-energizes signal 18 and energizes signal 16. For instance, depressing the clutch pedal operates switch 13 closing contact members 20 and 27 and breaking contact between members 20 and 21 to de-energize caution signal 18. Switch member 27 is electrically connected to 30 of switch 14 and in contact with 31 which is electrically connected with speed reduction signal 16.

On the other hand if the driver depresses brake pedal only switch 14 is operated to break circuit between members 22 and 23 to de-energize signal 18, and closes contact between switch members 22 and 24 electrically connected to 15 of 13 thence thru contact to 26 and signal 16.

If while the brake pedal is depressed the clutch pedal is depressed switch 13 opens contact between members 25 and 26 to de-energize signal 16, and closes contact between 20 and 27 electrically connected to 28 of switch 14, now operated. Contact is now closed between 28 and 29 and 17 is energized to give a stop signal.

These signals flashed automatically warn the drivers of following vehicles of any action taken by the leading driver that will reduce the speed of his vehicle the very instant that action is taken and much sooner than can be discerned by observation of the slowing down of the leading car.

To come to a full stop the clutch pedal is depressed operating danger signal 17 by closing contact between members 20 and 27 of device 13 and contact between members 28 and 29 of device 14 previously operated by the brake pedal as stated above.

In traffic, the signals outlined above protect the leading motor vehicle and in turn protect following vehicles by these signals exhibited at the instant the operation to cause a change in pace is made.

I claim as my invention—

1. In a vehicle having driver operated control means for a motor, a clutch, a brake, and a gear shift, a plurality of visual signals each having an electric circuit and a control switch, a common source of electric power and a circuit connection between said source and said signal circuits including a master switch for all signal circuits, a connection between the gear shift control means and the master switch for breaking the circuit when the gear shift is in neutral position and close it when in operative position, a connection between the motor control means and one of the signal circuit switches for closing a circuit to operate a signal when motor speed is reduced, a connection between the clutch control means and another signal circuit switch for closing another circuit to operate a signal when the clutch is manipulated, a connection between the brake control means and another signal circuit switch for closing another circuit to operate a signal when the brake control means is manipulated.

2. In a vehicle having driver operated control means for a motor, a clutch, a brake, and a gear shift, a plurality of visual signals each having an electric circuit and a control switch, a common source of electric power and a circuit connection between said source and said signal circuits and including a master switch for all signal circuits, a connection between the gear shift control means and the master switch for breaking the circuit when the gear shift is in neutral position and close it when in operative position, a connection between the motor control means and one of the signal circuit switches for closing a signal circuit to operate a signal when motor speed is reduced, a connection between the brake control means and another signal circuit switch for closing another signal circuit to operate a signal when the brake control means is manipulated, and circuit connections between the several signal control switches, said signal control switches including means operated by each driver operated control means for opening a previously closed signal circuit when the signal switch controlled by such means is closed.

3. In a vehicle having a plurality of driver operated control means whereby the operation of the vehicle is controlled, a plurality of separate visual signals each having an electric circuit and a control switch, a common source of electric power and a circuit connection between said source and the signal circuits including a master switch for all signal circuits, separate connections between some of the vehicle control means and the signal circuit switches, each switch being associated with a separate vehicle control means, connection means between one of said vehicle control means and the master switch for maintaining the master switch closed during the time that the vehicle is in operation and for opening it when the vehicle is not in operation, the connections between the driver operated control means and their respective signal circuit control switches operating to close said switches when the respective control means are manipulated whereby when the master switch is closed upon each manipulation of the several control means a signal circuit is closed to operate a signal.

4. In a vehicle having a plurality of driver operated control means whereby the operation of the vehicle is controlled, a plurality of separate visual signals each having an electric circuit and a control switch, a common source of electric power and a circuit connection between said source and the signal circuits including a master switch for all signal circuits, separate connections between some of the vehicle control means and the signal circuit control switches, each control switch being associated with a separate vehicle control means, connection means between one of said vehicle control means and said master switch for maintaining the master switch closed during the time that the vehicle is in operation and for opening it when the vehicle is not in operation, the connections between the driver operated control means and their respective signal control switches operating to close said switches when the respective means are manipulated whereby when the master switch is closed upon each manipulation of the several vehicle control means a signal circuit is closed to operate a signal, and circuit connections between the several signal circuit control switches, said switches including means operated by the respective vehicle control means for opening a previously closed signal circuit when the switch controlled by such vehicle control means is closed.

BENJAMIN LOT PARKER.